(12) United States Patent
Prein et al.

(10) Patent No.: US 6,706,848 B1
(45) Date of Patent: Mar. 16, 2004

(54) METHOD FOR PRODUCING POLYCARBONATE

(75) Inventors: Michael Prein, Brasschaat (BE); Uwe Hucks, Alpen (DE); Rolf Lanze, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 10 days.

(21) Appl. No.: 10/129,858

(22) PCT Filed: Nov. 3, 2000

(86) PCT No.: PCT/EP00/10828

§ 371 (c)(1),
(2), (4) Date: May 10, 2002

(87) PCT Pub. No.: WO01/36511

PCT Pub. Date: May 25, 2001

(30) Foreign Application Priority Data

Nov. 15, 1999 (DE) .......................................... 199 54 787

(51) Int. Cl.$^7$ ............................................... C08G 64/00
(52) U.S. Cl. ....................................... 528/196; 528/198
(58) Field of Search .................................. 528/196, 198

(56) References Cited

U.S. PATENT DOCUMENTS

| 4,354,046 A | 10/1982 | Ladewig et al. ............. 568/724 |
| 4,912,263 A | 3/1990 | Rudolph et al. ............. 568/722 |
| 5,300,623 A | 4/1994 | Boden et al. ................ 528/199 |
| 5,723,689 A | 3/1998 | Pressman et al. ........... 568/724 |

FOREIGN PATENT DOCUMENTS

| EP | 0 360 578 | 3/1990 |
| EP | 0 676 626 | 10/1995 |
| EP | 0 719 814 | 7/1996 |
| GB | 1580909 | 2/1978 |

*Primary Examiner*—Terressa Boykin
(74) *Attorney, Agent, or Firm*—Joseph C. Gil; Aron Preis; Gary F. Matz

(57) ABSTRACT

A process for producing polycarbonate is disclosed. The process entails transesterification of at least one carbonic ester with a mixture that contains dihydroxyl compound and phenol. The amount of bisphenol A in the mixture is 10 to 100 mol % relative to the amount of dihydroxyl compound and phenol is present in the mixture in an amount of 0.1 to 200% relative to the weight of bisphenol A.

6 Claims, No Drawings

METHOD FOR PRODUCING POLYCARBONATE

The present invention relates to a process for producing polycarbonate by transesterification of carbonic esters with dihydroxyl compounds, wherein the dihydroxyl compounds have a content of at least 10 mol % 2,2-bis(4-hydroxyphenyl)propane (also referred to as bisphenol A, abbreviated below to BPA) and wherein bisphenol A is used as a mixture with phenol.

The production of polycarbonate by transesterification of carbonic esters with dihydroxyl compounds is known. This process is described, for example, in the monograph by H. Schnell, Chemistry and Physics of Polycarbonates, Polymer Reviews, Volume 9, John Wiley and Sons, 1964, pages 44–51. This process is also described in Encyclopedia of Polymer Science, Volume 10, 1969.

The process for producing polycarbonate by transesterification is particularly suitable for the production of the homopolycarbonate of bisphenol A (BPA). To this end, bisphenol A is transesterified with carbonic esters, preferably diphenyl carbonate. The process for producing polycarbonate by transesterification is also suitable for the production of copolycarbonates based on bisphenol A and further dihydroxyl compounds as participants in the copolymerisation. To this end, bisphenol A and the further dihydroxyl compounds are transesterified with carbonic esters, preferably diphenyl carbonate.

In the production of polycarbonate by transesterification, the coreactants (dihydroxyl compounds and carbonic esters and optionally further auxiliary substances and additives such as, for example, branching agents) are reacted together in an in most cases multistep reaction, preferably in the melt, preferably with addition of a transesterification catalyst or of a combination of several transesterification catalysts, with splitting-off of a hydroxyl compound from the carbonic ester. If the carbonic ester used is diphenyl carbonate, the hydroxyl compound split off is phenol.

The reaction equilibrium is constantly shifted by varying the temperature and pressure above the reaction mixture. By continued condensation, light-coloured, solvent-free polycarbonates can be obtained in this way.

A wealth of catalysts, embodiments of the process and apparatus employed have been described for the transesterification process for producing polycarbonates.

The transesterification process for producing polycarbonates has the advantage that it requires no solvent and no phosgene, which are required in the so-called phase interface process for producing polycarbonates. The transesterification process for producing polycarbonates therefore renders possible an economical and non-polluting production of polycarbonate, which moreover has the advantage of being free from chlorine.

The process for producing polycarbonate by transesterification generally requires high standards of purity in the starting materials and the auxiliary substances used. The specific form in which the starting materials and the auxiliary substances are introduced can also influence the process and the quality of the polycarbonate product.

For example, DE-A 2 439 552 reports that the use of bisphenol A and diphenyl carbonate as melts which have not passed through the solid state as pure substances leads to improved qualities in the polycarbonate product.

The effect of various forms of introducing the catalyst used has also been investigated. Thus, for example, EP-A 0 719 814 describes an embodiment wherein an alkaline catalyst is first of all dissolved in an adduct mixture of bisphenol and phenol. The phenol is subsequently removed and the resulting solution of the catalyst in the bisphenol is reacted with a suitable carbonic ester.

The production of the high-purity bisphenol A which is required for producing polycarbonate by the transesterification process can be carried out, for example, from phenol and acetone with acid catalysis, as described in DE-A 3 727 641 or in U.S. Pat. No. 2,858,342. The addition of a cocatalyst is possible.

In the conventional process for producing bisphenol A, the reaction mixture consisting of acetone and phenol is passed through the reaction zone, after which bisphenol A is obtained first of all as a solution in the reaction mixture. At this point the reaction mixture consists mainly of phenol and bisphenol A. Besides these, the reaction mixture also contains secondary products typically obtained during the production of bisphenol A, such as, for example, o,p-bisphenol A, methylated hydroxyphenylindanoles, methylated hydroxyphenylchromanoles, p-isopropenyl-phenol and its dimers, trimers and oligomers, as well as higher condensates having three or more aromatic nuclei.

For the purification of bisphenol A, bisphenol A is obtained in the form of an approximately equimolar adduct with phenol; this is typically achieved by crystallisation of bisphenol A from the reaction mixture. The bisphenol A is then further purified. This further purification can be carried out, for example, by recrystallisation from water or from suitable organic solvents or mixtures thereof, as described, for example, in U.S. Pat No. 4,354,046 or in EP-A 0 626 408. The purification and separation of phenol by melt crystallisation, desorption or by multistep distillation is also described, for example, in EP-A 0 785 181 and EP-A 0 676 626.

The separation of unwanted secondary products from the process for the production of bisphenol A and the separation of phenol from the initially isolated adduct of bisphenol A and phenol are effected through the use of the above-mentioned purification processes or through a combination of several of the above-mentioned purification processes. At high technological expense, it is thereby possible to purify bisphenol A almost completely from the secondary products typically formed during the production and from phenol, and to obtain it in a purity of up to more than 99.9%.

Bisphenol A thus produced can be stored and processed in the form of powder, flakes or pellets, or dissolved in the form of sodium salt in sodium hydroxide solution, in order to be used for the production of polycarbonate by the phase interface process. The high-purity bisphenol A thus produced can also be used as starting material for the production of polycarbonates by the transesterification process.

The object of the present invention is to provide a process for producing polycarbonate by transesterification of carbonic esters with dihydroxyl compounds which have a content at least 10 mol % bisphenol A, without this process requiring the expensive purification processes for bisphenol A which are known from prior art.

The object according to the invention is achieved by a process for producing polycarbonate by transesterification of carbonic esters with dihydroxyl compounds which contain at least 10 mol % bisphenol A, wherein bisphenol A is not used as pure substance, for example, in the form of powder, flakes, pellets or as melt, in the manner known from prior art, but wherein bisphenol A is used as a mixture with phenol.

This method of achieving the object according to the invention is surprising because, by avoiding purification steps in the production of bisphenol A, it enables bisphenol A to be made available far more simply and more economically by using the mixture of phenol and bisphenol A obtained during the production of bisphenol A directly for the production of polycarbonate. The known prior art assumes that this is not possible, and that bisphenol A has to be made available in pure form by means of expensive purification processes in order for it to be usable in a transesterification process for the production of polycarbonate.

The invention accordingly provides a process for producing polycarbonate by transesterification of carbonic esters with dihydroxyl compounds, characterised in that 10 to 100 mol % of the molar quantity of dihydroxyl compounds used in total is bisphenol A and that bisphenol A is used as a mixture of bisphenol A and 0.1 to 200 wt. % phenol, based on the weight of bisphenol A.

Preferably mixtures containing 5 to 85 wt. % phenol, particularly preferably mixtures containing 10 to 70 wt. % phenol, based on the weight of bisphenol A, are used.

The process according to the invention has numerous advantages. It yields polycarbonate, the quality of which at least equals that of the polycarbonate produced by known processes. In particular, the polycarbonate produced by the process according to the invention has good visual properties such as, for example, high transparency, and good mechanical properties such as, for example, high strength and toughness.

Through the omission from the production of bisphenol A of purification steps hitherto considered to be necessary, the process according to the invention is technologically simpler and hence more economical, as well as less polluting.

In the production of bisphenol A by the known prior art processes, mixtures of bisphenol A and phenol are generally obtained at one point in the production process. According to prior art, these mixtures are then freed from phenol by expensive processing steps, in order to obtain high-purity bisphenol A. In addition to the technological expense required here, the bisphenol A is subjected here to heat stress, particularly where desorption or distillation techniques are employed for the removal of phenol. This can lead to the formation of unwanted coloured accompanying substances. The process according to the invention does not have this disadvantage. This is clear from the data in Table 1. The Table shows the boiling points and melting points of bisphenol A-phenol mixtures. It is clear that the boiling points and melting points of the mixtures increase sharply at low phenol contents. This means that disproportionately high temperatures are necessary in order to remove the last traces of phenol, for example, by distillation or desorption.

TABLE 1

Boiling points and melting points of bisphenol A-phenol mixtures

| Wt. % Bisphenol A | Wt. % Phenol | Phenol content (%)1) | Boiling point at 150 mbar in °C. | Boiling point at 50 mbar in °C. | Melting point in °C. |
|---|---|---|---|---|---|
| 99.95 | 0.05 | 0.05 | >320 | >300 | 156.8 |
| 99.90 | 0.10 | 0.10 | 315 | 280 | 156.7 |
| 95.00 | 5.00 | 5.26 | 205 | 170 | 152 |
| 90.0 | 10.0 | 11.11 | 175 | 142 | 147 |
| 70.0 | 30.0 | 42.86 | 142 | 114 | 117 |
| 60.0 | 40.0 | 66.67 | 136 | 110 | 98 |

1)Calculated as (wt. % phenol divided by wt. % bisphenol A) times 100%.

The heat stress on bisphenol A and the residence time in apparatus for the removal of phenol are both decreased by the use of mixtures of bisphenol A and phenol according to the invention. Here it should be borne in mind that, with decreasing phenol contents in the mixtures of phenol and bisphenol A, the vapour pressure of the phenol above the mixture likewise sharply decreases, so that the removal of phenol from a mixture of bisphenol A and phenol in cases where phenol contents are low requires high temperatures and long residence times. High temperatures and long residence times can lead, for example, to unwanted coloured secondary products. The process according to the invention does not have this disadvantage.

As hydroxyl compounds always have to be split off and separated from the carbonic esters during the production of polycarbonate from carbonic esters and dihydroxyl compounds by the transesterification process, the technological units required for the separation of these hydroxyl compounds are always present in the corresponding units for producing polycarbonate by transesterification. The use of mixtures of phenol and bisphenol A according to the invention in the production of polycarbonate by transesterification leads correspondingly to a reduction in the effort and costs of purification of bisphenol A during the production of bisphenol A, without an increase in the technological expense during the transesterification.

A further advantage of the process for producing polycarbonate according to the invention is that, as a result of using mixtures of bisphenol A and phenol as raw materials, a better quality of polycarbonate can be obtained as compared with a process for producing polycarbonate by transesterification in which pure bisphenol A is used. This is understandable when one considers that the raw material, as is conventional in industrial plants, is usually metered continuously in the form of a melt. Through the lowering of the melting point—as a result of the phenol content—of the mixture of bisphenol A and phenol relative to the melting point of pure bisphenol A (see Table 1), the melt can be stored in the liquid state at a lower temperature. For example, the melting temperature of 156.8° C. for pure bisphenol A is lowered to 147° C. at a phenol content of 11%, based on bisphenol A, and to 98° C. at a phenol content of 67%, based on bisphenol A. This brings about a lower heat stress on the mixtures of bisphenol A and phenol, for example, during retention in pipelines and buffer tanks. This results in an improved quality, expressed, for example, in a better colour index, for example, the Yellowness Index (Y.I) of the polycarbonate produced according to the invention, as compared with polycarbonate produced using a melt of pure bisphenol A.

Any carbonic ester can be used according to the invention. Diphenyl carbonate is preferred.

According to the invention, the bisphenol A content of the molar quantity of dihydroxyl compounds used in total is 10 to 100 mol %, preferably 20 to 100 mol %, particularly preferably 40 to 100 mol % and most particularly preferably 100 mol %.

According to the invention, the phenol content of the mixture of phenol and bisphenol A is 0.1 to 200 wt. %, preferably 5 to 85 wt. %, particularly preferably 10 to 70 wt. %, based on the total weight of bisphenol A used.

The mixture of phenol and bisphenol A can be in the form of a purely physical mixture, in the form of mixed crystals or in the form of an adduct or in another form. The mixture can be solid or liquid. For example, it can be a melt. A melt which can be used directly for producing polycarbonate by the transesterification process is preferred.

The secondary products typically formed during the production of bisphenol A may also be present in the mixture of phenol and bisphenol A according to the invention; examples of secondary products are o,p-bisphenol A, methylated hydroxyphenyl-indanoles, methylated hydroxyphenylchromanoles, p-isopropenylphenol or its dimers or its trimers or its oligomers, as well as higher condensates having three or more aromatic nuclei. Preferably, these or other additional substances besides bisphenol A and phenol are present in the mixture of bisphenol A and phenol in a quantity of 0.05 to 1.0 wt. %, based on bisphenol A, particularly preferably in a quantity of 0.1 to 0.5 wt. %, based on bisphenol A.

The mixture according to the invention, consisting of BPA, phenol and optionally secondary products from the BPA production, originates preferably from the reaction of phenol and acetone in a molar ratio of at least 5:1 (phenol:acetone), with acid catalysis, optionally with the addition of a cocatalyst and with the subsequent carrying-out of workup steps which are suitable for producing the described mixture. Such steps are, for example, crystallisation, recrystallisation from organic or aqueous solvents or mixtures thereof, melt crystallisation, desorption, or distillation.

Acid catalysts used can be, for example, acidic cross-linked sulfonated polystyrenes, mineral acids such as, for example, sulfuric acid or hydrogen chloride and aqueous solutions thereof or acidic inorganic solid substances such as, for example, zeolites or metal oxides.

Cocatalysts used can be, for example, organic or inorganic sulfur compounds, such as hydrogen sulfide, alkylmercaptans or thioethers.

The production of BPA can be carried out continuously or batchwise. The flow of reactants may consist of fresh acetone and phenol. Alternatively, a portion of the reaction mixture obtained after the separation of BPA can be replenished with acetone and phenol and returned to the beginning of the reaction zone.

The embodiments of the reaction between acetone and phenol described above yield a mixture of BPA, phenol, water, optionally unreacted acetone and secondary products, with a phenol content of preferably more than 55 wt. %, based on the total weight, and a content of secondary products of more than 1.0 wt. %, based on BPA obtained.

The mixture described above can be subjected to the following workup steps in order to recover from it the mixture according to the invention, consisting of BPA, phenol and optionally secondary products from the above-mentioned reaction for producing bisphenol A: crystallisation from the product mixture and subsequent filtration, separation of acetone and/or water by distillation, recrystallisation from suitable organic solvents or mixtures thereof or from emulsions with water, melt crystallisation, partial separation of phenol by distillation, partial or complete separation of secondary products by distillation, partial removal of phenol by desorption, partial removal of phenol from BPA-phenol mixtures by treatment with water or with suitable organic solvents. Equally possible according to the invention is the introduction of phenol at a point in the workup steps described here, in addition to the quantity of phenol introduced into the reaction step between acetone and phenol, for example, in order to wash the intermediate and end products of the above-mentioned workup steps or in order to form adduct crystals of BPA and phenol by mixing together BPA and phenol.

The processing steps described can be carried out individually, repeatedly or combined in any sequence. Equally, products from the workup steps described can be combined in any proportions until a mixture consisting of BPA, phenol and optionally aforementioned secondary products from the reaction step for producing bisphenol A is obtained with a phenol content of 0.1 to 200 wt. %, preferably 5 to 85 wt. %, particularly preferably 10 to 70 wt. %, based on the weight of BPA and with a total content of secondary products of 0.05 to 1.0 wt. %, preferably 0.1 to 0.5 wt. %, based on BPA obtained.

The mixture thus produced, consisting of BPA, phenol and optionally secondary products, is preferably, optionally together with further dihydroxyl compounds, converted in known per se manner into high-molecular, light-coloured polycarbonate by transesterification with suitable carbonic esters, with splitting-off of the hydroxyl component of the carbonic ester. In this transesterification process, which is carried out preferably in the melt, polycarbonates or copolycarbonates are produced from preferably aromatic dihydroxyl compounds or from mixtures of various preferably aromatic dihydroxyl compounds, carbonic esters and optionally branching agents, chain stoppers and further auxiliary substances and additives. Here the mixture of bisphenol A and phenol according to the invention can be introduced into the process in the form of a solid substance or as a melt.

The reaction can be accelerated by catalysts, selected preferably from the following classes of substances, or by a combination of several catalysts, selected preferably from the following classes of substances: basic, nitrogen-containing compounds, ammonium salts, basic, phosphorus-containing compounds, phosphonium salts, organic acids, basic, neutral or acid salts of metals of the alkali-metal or alkaline-earth groups of the periodic system. The catalysts can be introduced as pure substances or as solutions.

In a typical embodiment of the reaction, the mixture of bisphenol A and phenol according to the invention is reacted with 0.9 to 1.5 mol diphenyl carbonate per mol BPA at temperatures of 0° C. to 350° C. and pressures of 2 bar to 0.01 mbar. Tetraphenylphosphonium phenolate in quantities of 10-1 mol to 10-8 mol, preferably in quantities of 10-3 mol to 10-7 mol, per mol BPA and optionally sodium phenolate in quantities of 10-3 mol to 10-9 mol, preferably in quantities of 10-5 mol to 10-8 mol, per mol BPA are used as transesterification catalysts.

Other details about the melt transesterification process for producing polycarbonate are known. See, for example, Hermann Schnell, Chemistry and Physics of Polycarbonates, Polymer Reviews, Vol. 9. 1964, pages 44–51, DE-A 1 031 512, U.S. Pat. Nos. 3,022,272, 5,340,905 and 5,399,659.

The processes described there for producing high-molecular polycarbonate from pure BPA and suitable carbonic esters differ from the process according to the invention because the use of the mixtures of BPA and phenol according to the invention necessitates the separation of a correspondingly greater quantity of phenol, which is ensured by appropriate dimensioning of the apparatus used for the removal of phenol. Where mixtures having low phenol contents, for example, less than 10 wt. %, are used, frequently no alteration of the dimensioning is necessary at all, owing to the insignificant quantity.

The reaction of the aromatic dihydroxyl compounds and the carbonic esters to form polycarbonate can be carried out batchwise or continuously in the process according to the invention. The continuous procedure is preferred. The reaction can be carried out, for example, in agitated tanks, film evaporators, downflow evaporators, stirred-tank reactors in series, extruders, kneaders, simple disc reactors and high-viscosity disk reactors.

The polycarbonates from the process according to the invention preferably have weight average molar masses Mw of 18,000 to 200,000 g/mol, preferably 19,000 to 60,000 g/mol, determined by measurement of the relative solution viscosity in dichloromethane or in mixtures of equal quantities by weight of phenol/o-dichloro-benzene, calibrated by light-scattering.

In order to limit the weight average molar masses Mw of the polymers, molar-mass regulators such as, for example, alkylphenols, can be added in known manner in suitable quantities, as described, for example, in EP-A 0 360 578.

Auxiliary substances and reinforcing materials can be admixed to the polycarbonates produced according to the invention, in order to improve their properties. Those which may be considered include: stabilisers, flow-control agents, mould-release agents, fire retardants, pigments, finely-divided minerals, fibrous materials, for example, alkyl and aryl phosphites, alkyl and aryl phosphates, alkyl and aryl phosphanes, acids, epoxides, low-molecular carboxylic esters, halogen compounds, salts, chalk, quartz powder, glass fibres and carbon fibres.

Other polymers may also be admixed to the polycarbonates according to the invention, for example, polyolefins, polyurethanes, polystyrene, thereby forming so-called polymer blends.

These substances are preferably added to the finally prepared polycarbonate in conventional units, but, depending on the requirements, they may also be added at another stage of the process according to the invention.

Moreover, for particular applications it is also possible to modify the polycarbonates by condensation of blocks, segments and comonomers, for example, siloxane blocks with OH terminal groups, aromatic and aliphatic polyesters with OH terminal groups and carboxylic terminal groups, polyphenylene sulfide blocks with OH terminal groups, polyphenylene oxide blocks with OH terminal groups.

The polycarbonates produced according to the invention are suitable for the conventional fields of application, thus, for example, in electrical engineering, in the construction sector and in motor vehicle manufacture, for example, as media for data storage, for multi-wall sheets for covering in the field of construction or as housing material for electronic equipment.

The process according to the invention produces high-molecular, light-coloured and solvent-free polycarbonate (weight averages of the molar mass preferably from 12,000 to 50,000 g/mol) which has a range of properties which is equal to or better than that of polycarbonate obtained with the use of pure BPA. Through the use according to the invention of BPA which contains phenol and optionally secondary components from the production of BPA, the technological expense of purifying BPA can be restricted and light-coloured products can easily be obtained.

The mixture of phenol and BPA according to the invention mixed with other dihydroxyl compounds can be used for the production of copolycarbonates according to the invention. Examples of other dihydroxyl compounds are:

4,4'-dihydroxydiphenyl,
2,4-bis(4-hydroxyphenyl)-2-methylbutane,
1,1-bis(4-hydroxyphenyl)cyclohexane,
α,α-bis(4-hydroxyphenyl)-p-diisopropylbenzene,
α,α-bis(4-hydroxyphenyl)-m-diisopropylbenzene,
2,2-bis(3-methyl4-hydroxyphenyl)propane,
2,2-bis(3-chloro4-hydroxyphenyl)propane,
bis(3,5-dimethyl4-hydroxyphenyl)methane,
2,2-bis(3,5-dimethyl-4-hydroxyphenyl)propane,
bis(3,5-dimethyl4,4-hydroxyphenyl) sulfone,
2,4-bis(3,5-dimethyl4-hydroxyphenyl)-2-methylbutane,
1,1-bis(3,5-dimethyl4-hydroxyphenyl)cyclohexane,
α,α-bis(3,5-dimethyl-4-hydroxyphenyl)-p-diisopropylbenzene,
1,1-bis(4-hydroxyphenyl)3,3,5-trimethylcyclohexane,
1,1-bis(4-hydroxyphenyl)-3-methylcyclohexane,
1,1-bis(4-hydroxyphenyl)-3,3-dimethylcyclohexane,
1,1-bis(4-hydroxyphenyl)-4-methylcyclohexane,
2,2-bis(3,5-dichloro-4-hydroxyphenyl)propane,
2,2-bis(3,5-dibrom-4-hydroxyphenyl)propane,
1,1-bis(4-hydroxyphenyl)-1-phenylethane,
2,2-bis(3,5-dimethyl-4-hydroxyphenyl)-2-phenylethane,
2,2-bis(4-hydroxyphenyl)-2,2-diphenylethane,
9,9-bis(4-hydroxyphenyl)fluorene,
9,9-bis(3,5-dimethyl-4-hydroxyphenyl)fluorene.

The following other dihydroxyl compounds are particularly preferred:

2,2-bis(3,5-dimethyl4-hydroxyphenyl)propane,
1,1-bis(4-hydroxyphenyl)cyclohexane,
1,1-bis(4-hydroxyphenyl)-1-phenylethane,
1,1-bis(4-hydroxyphenyl)-3,3,5-trimethylcyclohexane,
1,1-bis(4-hydroxyphenyl)-3-methylcyclohexane,
1,1-bis(4-hydroxyphenyl)-4-methylcyclohexane,
9,9-bis(3,5-dimethyl-4-hydroxyphenyl)fluorene.

EXAMPLES

The following Examples demonstrate the advantageousness of the procedure according to the invention. The invention is not limited to the Examples. The BPA/phenol samples 1 to 5 were produced by various expensive workup steps. In this connection, a simplified workup was adopted in the case of samples 1, 2, 3 by dispensing with a complete removal of phenol. The samples thus produced were converted into high-molecular polycarbonate by melt transesterification according to a standard procedure (Examples 1 to 4, Comparison Examples 1, 2). The results in Table 3 show that no improvement in the quality of the PC product is achieved through the expensive removal of phenol.

The positive effect of the procedure according to the invention with regard to the stability in storage is shown in Examples 5, 6 as compared with Comparison Example 3. The retention in pipelines or buffer tanks of the raw material for the production of PC by the transesterification process was simulated by storing phenol-containing and phenol-free BPA samples just above their melting point. Through the use of phenol-containing mixtures, the melt transesterification with diphenyl carbonate subsequently yielded polycarbonate which, with regard to relevant quality criteria (viscosity, yellowness index) is better than that obtained with the use of phenol-free BPA.

The following BPA samples were used in the Examples.

BPA sample 1 (for Examples 1 and 2): A sample having the composition given in Table 2 was obtained from the industrial production of BPA from phenol and acetone on acidic ion exchangers, after crystallisation of a BPA-phenol adduct.

BPA sample 2 (for Example 3): Sample 2 was obtained by partial distillation of phenol out of BPA sample 1 at 170° C. and 180 mbar.

BPA sample 3 (for Example 4): Sample 3 was obtained by recrystallisation of BPA sample 1 from phenol.

BPA sample 4 (for Comparison Example 1): Sample 4 was obtained by desorption of phenol out of BPA sample 1 with nitrogen at 190° C. and subsequent two-step distillation.

BPA sample 5 (for Comparison Example 2): Sample 5 was obtained by two-step recrystallisation of BPA sample 1 from toluene and subsequent drying at 120° C. and 5 mbar.

BPA sample 6 (for Example 5): A melted sample of BPA sample 1 (fp 99° C.) was stored as melt for 4 hours at 105° C. and then cooled to room temperature.

BPA sample 7 (for Example 6): A melted sample of BPA sample 2 (fp 136° C.) was stored as melt for 4 hours at 140° C. and then cooled to room temperature.

BPA sample 8 (for Comparison Example 3): A melted sample of BPA sample 4 (fp 156° C.) was stored as melt for 4 hours at 160° C. and then cooled to room temperature.

In Table 2 above, secondary products are the content in wt. % of secondary products typically obtained during the production of BPA, for example, o,p-BPA, dimethylxanthene, indanoles, chromanes, 4-isopropenylphenol and its oligomers and unknown constituents.

Carrying out of Examples 1–6 and Comparison Examples 1–3

113.54 g (0.530 mol) diphenyl carbonate and a corresponding quantity of the investigated samples 1 to 8 were weighed into a 500 ml three-necked flask equipped with stirrer, internal thermometer and Vigreux column (30 cm, silvered) with bridges, so that the mixture contained 114.15 g (0.500 mol) bisphenol A. The apparatus was freed from atmospheric oxygen by applying a vacuum and flushing with nitrogen (3 times) and the mixture was heated to 150° C. Then 4×10-3 mol. % tetraphenylphosphonium phenolate, based on bisphenol A, and the quantity of sodium phenolate given in Table 3, based on bisphenol A, were added as solid substances. The resulting phenol was distilled off at 100 mbar. At the same time, the temperature was raised to 250° C. The vacuum was then enhanced stepwise to 1 mbar and the temperature increased to 260° C. The temperature was then increased to 300° C. and stirred for 1.5 hours at 0.1 mbar. A light-coloured, solvent-free polycarbonate was obtained, the properties of which are listed in Table 3.

TABLE 3

|  | Example 1 | Example 2 | Example 3 | Example 4 | Example 5 | Example 6 | Comparison Example 1 | Comparison Example 2 | Comparison Example 3 |
| --- | --- | --- | --- | --- | --- | --- | --- | --- | --- |
| BPA sample | 1 | 1 | 2 | 3 | 6 | 7 | 4 | 5 | 8 |
| Sodium phenolate (ppm) | 0.3 | — | 0.3 | 0.3 | 0.3 | 0.3 | 0.3 | 0.3 | 0.3 |
| $\eta rel^{1)}$ | 1.25 | 1.23 | 1.22 | 1.25 | 1.26 | 1.25 | 1.22 | 1.23 | 1.22 |
| OH content (%)[2] | 0.013 | 0.021 | 0.023 | 0.020 | 0.018 | 0.020 | 0.024 | 0.019 | 0.021 |
| Y.I.[3] | 2.6 | 2.4 | 2.5 | 2.3 | 2.6 | 2.6 | 2.8 | 2.5 | 4.2 |

[1] $\eta rel$ = relative solution viscosity (polycarbonate dissolved in dichloromethane, measured at 25° C. and at a concentration of c = 5 g/l)
[2] Content of phenolic OH groups in the polycarbonate determined via a calibrated base-line corrected IR spectrum with extinction at 3,490 cm$^{-1}$.
[3] Yellowness Index as a measure of the brightness of the polycarbonate determined by means of a Hunter Lab colorimeter on coloured sample sheets (thickness 4 mm) from the respective polycarbonate sample, in accordance with ASTM E 313.

TABLE 2

Composition of samples 1 to 5

|  | Sample 1 | Sample 2 | Sample 3 | Sample 4 | Sample 5 |
| --- | --- | --- | --- | --- | --- |
| BPA (wt. %) | 59.28 | 83.36 | 58.45 | 99.93 | 99.96 |
| Phenol (wt. %) | 40.34 | 16.26 | 41.49 | <0.01 | <0.01 |
| Secondary products (wt. %) | 0.38 | 0.38 | 0.06 | 0.07 | 0.04 |

What is claimed is:

1. A process for producing polycarbonate by transesterification of carbonic esters with dihydroxyl compounds, characterised in that 10 to 100 mol % of the molar quantity of dihydroxyl compounds used in total is bisphenol A and that bisphenol A is used as a mixture of bisphenol A and phenol being 5 to 85 wt. %, based on the weight of bisphenol A.

2. Process according to claim 1, wherein the content of phenol in the mixture of bisphenol A and phenol is 10 to 70 wt. %, based on the weight of bisphenol A.

3. Process according to claim 1, wherein the mixture of bisphenol A and phenol contains secondary products typically formed during the production of bisphenol A.

4. Process according to claim 3, wherein the secondary products are present in the mixture of bisphenol A and phenol in a quantity of 0.05 to 1.0 wt. %, based on bisphenol A.

5. Process according to claim 3, wherein the secondary products are present in the mixture of bisphenol A and phenol in a quantity of 0.1 to 0.5 wt. %, based on bisphenol A.

6. A process for producing polycarbonate comprising reacting at least one carbonic ester with a mixture that contains at least one dihydroxyl compound and at least one phenol wherein 10 to 100 mol % of the dihydroxyl compound is bisphenol A and wherein phenol is present in the mixture in an amount of from 5 to 85 wt. % relative to the weight of bisphenol A.

* * * * *